US009338667B2

(12) United States Patent
Ma (10) Patent No.: US 9,338,667 B2
(45) Date of Patent: May 10, 2016

(54) DRILLING TECHNOLOGY UTILIZING HIGH TEMPERATURE AND LOW TEMPERATURE DISCHARGES

(75) Inventor: Yuchen Ma, Shanghai (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 260 days.

(21) Appl. No.: 14/006,291

(22) PCT Filed: Apr. 18, 2011

(86) PCT No.: PCT/CN2011/072916
§ 371 (c)(1),
(2), (4) Date: Sep. 19, 2013

(87) PCT Pub. No.: WO2012/142738
PCT Pub. Date: Oct. 26, 2012

(65) Prior Publication Data
US 2014/0008124 A1    Jan. 9, 2014

(51) Int. Cl.
*E21B 7/14* (2006.01)
*E21B 27/04* (2006.01)
*H04W 24/02* (2009.01)
*E21B 7/00* (2006.01)
*E21B 27/00* (2006.01)

(52) U.S. Cl.
CPC ............ *H04W 24/02* (2013.01); *E21B 7/00* (2013.01); *E21B 7/14* (2013.01); *E21B 27/00* (2013.01)

(58) Field of Classification Search
CPC ......... E21B 7/14; E21B 36/00; E21B 36/001; E21B 7/005; E21B 7/006; E21B 27/04
See application file for complete search history.

(56) References Cited

U.S. PATENT DOCUMENTS

| 2,738,162 | A | * | 3/1956 | Aitchison | ................ E21B 7/14 173/151 |
| 3,788,703 | A | | 1/1974 | Thorpe | |
| 4,593,763 | A | | 6/1986 | Burke | |

(Continued)

FOREIGN PATENT DOCUMENTS

| CA | 1251390 | 3/1989 |
| CN | 1387603 | 12/2002 |

(Continued)

OTHER PUBLICATIONS

Hydro-Fracturing for Low Yield Wells Water Well Drilling Pumps—Service & Installation; Well Development by Hydro-Fracturing, as downloaded on Sep. 3, 2013 from http://www.hydrofracturing.net/, 2 pp.
International Search Report for Intl. Pat. Appln. No. PCT/CN2011/072916, mailed Feb. 9, 2012, 5 pp.

*Primary Examiner* — Catherine Loikith
(74) *Attorney, Agent, or Firm* — Foley & Lardner LLP (57) ABSTRACT

A drilling apparatus (100) includes a drill bit (200), a heating assembly, a cooling assembly, and a digging assembly. The heating assembly is configured to rapidly heat a material to be drilled at a target location. The heating assembly includes one or more first discharge structures (520) configured to discharge a high-temperature substance at the target location of the material. The cooling assembly includes one or more second discharge structures (440) configured to discharge a low-temperature substance at the target location of the material. The digging assembly is configured to remove substrate from the material at the target location.

18 Claims, 7 Drawing Sheets

(56) References Cited

U.S. PATENT DOCUMENTS

| | | | |
|---|---|---|---|
| 5,771,984 A * | 6/1998 | Potter | E21B 7/15 175/14 |
| 7,270,195 B2 | 9/2007 | MacGregor et al. | |
| 2008/0257552 A1 | 10/2008 | Shurtleff et al. | |
| 2010/0089577 A1 | 4/2010 | Wideman et al. | |

FOREIGN PATENT DOCUMENTS

| | | |
|---|---|---|
| CN | 1863981 | 11/2006 |
| CN | 101107450 | 1/2008 |
| CN | 201068738 | 6/2008 |
| CN | 101343772 | 1/2009 |

* cited by examiner

DRILLING TECHNOLOGY UTILIZING HIGH TEMPERATURE AND LOW TEMPERATURE DISCHARGES

CROSS-REFERENCE TO RELATED APPLICATIONS

The present application claims the benefit under 35 U.S.C. §371 of International Application Serial No. PCT/CN2011/072916, filed on Apr. 18, 2011, the entire disclosure of which is incorporated herein by reference for any and all purposes in its entirety as if fully set forth herein.

BACKGROUND

The following description is provided to assist the understanding of the reader. None of the information provided or references cited is admitted to be prior art.

Oil, natural gas, water, and other natural resources have tremendous economic value. Such resources are often found far underground beneath various layers of strata possibly including hard rock such as granite. Underground resources are generally accessed through a drilling process. Efficient and inexpensive drilling processes are beneficial as they allow for increased exploitation of underground resources.

In traditional well drilling processes, mechanical drilling techniques using various rotary bits such as roller bits, polycrystalline diamond compact (PDC) bits, and diamond drill bits are often used. Different drill bits are designed to drill through various types of strata. In addition, some drilling processes use jet drilling wherein water or another substance is discharged at high pressure to perform the drilling. However, in the case of drilling through extremely hard strata such as granite these traditional drilling processes typically prove very difficult, and are generally time-consuming and expensive. In addition, current deep drilling technologies generally require a very large drilling platform which results in large expenses.

SUMMARY

The present technology provides an illustrative method for drilling using an improved drilling apparatus. The method includes discharging a high-temperature substance at a target location of a material to be drilled. The high-temperature substance is discharged from one or more first discharge structures of a heating assembly in order to rapidly heat the material at the target location. The method further includes discharging a low-temperature substance at the target location of the material. The low-temperature substance is discharged from one or more second discharge structures of a cooling assembly in order to rapidly cool the material at the target location. The method also includes operating a digging assembly to remove substrate from the material at the target location.

The present technology further provides an illustrative drilling apparatus that includes a drill bit, a heating assembly, a cooling assembly, and a digging assembly. The heating assembly is configured to rapidly heat a material to be drilled at a target location. The heating assembly includes one or more first discharge structures configured to discharge a high-temperature substance at the target location of the material. The cooling assembly is configured to rapidly cool the material at the target location and includes one or more second discharge structures configured to discharge a low-temperature substance at the target location of the material. The digging assembly is configured to remove substrate from the material at the target location.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Drilling through hard substrates such as granite can prove challenging using traditional drilling techniques such as jet drilling or mechanical rotary drilling. Hard substrates may render the drilling process time-consuming and expensive. Described herein are illustrative improved drilling technologies to increase the efficiency and decrease the expense of drilling through hard substrates.

Figure 1:
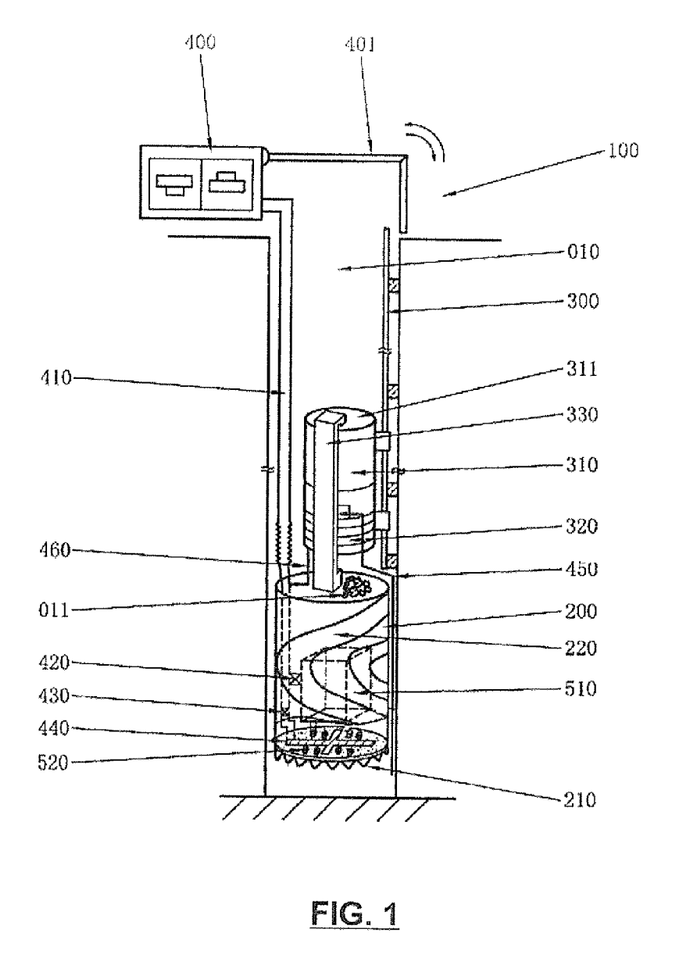
FIG. 1 depicts a drilling system in accordance with an illustrative embodiment.

FIG. 1 depicts a drilling apparatus 100 in accordance with an illustrative embodiment. Drilling apparatus 100 includes a heating assembly configured to rapidly heat a target location of a material to be drilled and a cooling assembly configured to rapidly cool the target location of the material to be drilled. In an embodiment, the heating assembly includes a heating source 510 that is located within a drill bit 200 and that is configured to produce a high temperature substance. The high temperature substance may include any substance that can be changed into a high temperature plasma. For example, the high temperature substance may include one or more of water, air, oxygen, nitrogen, and carbon dioxide. In at least one embodiment, the high-temperature substance is a high-temperature plasma having a temperature of between approximately 3,000 degrees Celsius and approximately 5,000 degrees Celsius. In additional embodiments, the high-temperature plasma may have a temperature of between approximately 2,000 degrees Celsius and approximately 20,000 degrees Celsius.

In an embodiment, heating source 510 includes a plasma generator that is configured to produce a high-temperature plasma. The plasma generator may include any plasma generator known to those of skill in the art. In at least one embodiment, the plasma generator may include a power assembly, an electric discharge chamber, and a plasma gas supply assembly. The power assembly is configured to provide power for the plasma generation process. In at least one embodiment, the power assembly may comprise an electrical or internal combustion engine. The electric discharge chamber is configured to transform regular gas into plasma via electrical discharge as known to those of skill in the art. The plasma gas supply assembly is configured to provide a supply substance (e.g., water, air oxygen, nitrogen, carbon dioxide, etc.) to the electric discharge chamber. The supply substance is provided to heating source 510 via a control valve 420. In at least one embodiment, control valve 420 is connected to a water supply and water is used as the supply substance to generate the high-temperature plasma. In additional embodiments, control valve 420 may be connected to alternative sources of supply substances that may be used to generate the high-temperature plasma. In at least one embodiment, control valve 420 is connected to a return passage 410 (which is described in additional detail below) and is configured to selectively allow water from return passage 410 to be supplied to heating source 510. In other embodiments, control valve 420 may be connected to a storage tank that stores a selected supply substance.

In another embodiment, heating source 510 includes a laser generator that is configured to produce and emit a high energy laser at the target location of the material to be drilled. In at least one embodiment, the laser generator is a high power laser generator that is capable of generating high energy laser beams. Examples of such laser generators may include a carbon dioxide laser generator, a semiconductor laser generator, an optical fiber laser generator, or other high energy laser generators as known to those of skill in the art. The laser generator may be located within drill bit 200 or may be installed at the top of drilling well 010 or at a distance from drill bit 200 and the laser may be routed to drill bit 200 via transmission mediums known to those of skill in the art, e.g., an optical fiber. In an embodiment, the laser generator is configured to emit a laser beam at the target location to rapidly heat the material to be drilled at the target location.

The heating assembly may also include a high-temperature substance discharge structure 520 that is configured to discharge the high-temperature substance to the material at the target location, thereby rapidly heating and stressing the material to be drilled at the target location. The high-temperature substance is provided to high-temperature discharge structure 520 from heating source 510 via piping or other transmission mediums known to those of skill in the art. As discussed above, in at least one embodiment, the high-temperature substance is a high-temperature plasma having a temperature of between approximately 2,000 degrees Celsius and approximately 20,000 degrees Celsius.

In at least one embodiment, heating source 510 may be included in a location other than within drill bit 200. Accordingly to such an embodiment, the high-temperature substance generated by heating source 510 may be conveyed via means known to those of skill in the art to high-temperature discharge structure 520. For example, wherein heating source 510 includes a plasma generator, the high-temperature plasma may be conveyed to high-temperature discharge structure 520 via piping. Wherein heating source 510 includes a laser generator, the emitted laser light may be conveyed to high-temperature discharge structure 520 via an optical medium or other transmission medium capable of transmitting emitted laser light as known to those of skill in the art or the laser generator may be oriented and configured such that it may transmit the emitted laser light at the target location from a distance.

As discussed above, drilling system 100 also includes a cooling assembly configured to rapidly cool the target location of the material to be drilled. The cooling assembly includes a vapor cooling structure 400 that is configured to collect and condense water vapor from within drilling well 010 to generate a low-temperature substance. According to such an embodiment, the low-temperature substance comprises water and is cooled to approximately 100 degrees Celsius. In another embodiment, the low-temperature substance may comprise carbon dioxide or a combination of water and carbon dioxide. According to such an embodiment, vapor cooling structure 400 is configured to collect and condense carbon dioxide and/or water from within drilling well 010 to generate the low-temperature substance. Carbon dioxide has a boiling point of −78.48 degrees Celsius and a melting point of −56.6 degrees Celsius and may be utilized in either liquid or solid form or may comprise a mixture containing carbon dioxide and other substances. In at least one embodiment, liquid carbon dioxide is used as the low-temperature substance and is maintained within the cooling assembly at a temperature of about 15 degrees Celsius and under a pressure of about 5 megapascals.

Use of carbon dioxide as the low-temperature substance offers several advantages. Liquid and solid carbon dioxide allow for the low-temperature substance to reach temperatures well below 0 degrees Celsius, which in turn creates increased stress on the material at the target location upon discharge of the low-temperature substance at the target location. The use of carbon dioxide also produces a protective barrier layer within drilling apparatus 100 which prevents oxidation of its components, thereby increasing the service life of drilling apparatus 100. Liquid and solid carbon dioxide also convert to gas very rapidly, which does not hinder the discharge of the high-temperature substance and also enables the recovery of the discharged carbon dioxide as discussed in more detail below.

In at least one embodiment, vapor cooling structure 400 is located at or near the wellhead of drilling well 010. Location of vapor cooling structure 400 at or near the wellhead provides easy access to vapor cooling structure 400 for maintenance or repair operations. In addition, according to one possible embodiment, vapor cooling structure 400 may include a liquefaction system that converts the recovered low-temperature substance from a gaseous form to a liquid form. Such a process may produce large amounts of heat. Location of vapor cooling structure 400 at or near the wellhead allows for the convenient dissipation of this heat into the ambient environment outside drilling well 010. In alternative embodiments, where heat dispersal may be accomplished within drilling well 010, vapor cooling structure 400 may be located within drilling well 010 at a distance from the wellhead.

In at least one embodiment, vapor cooling structure 400 includes a low-temperature substance collection layer that is positioned inside of the wellhead, and that functions as a plug for plugging the wellhead. As such, the low-temperature substance collection layer and the wellhead prevent the escape of the discharged low-temperature substance from the well. A low-temperature substance detection device is positioned within the drilling space of the well and is configured to detect the presence of the low-temperature substance. Upon detection of the presence of the low-temperature substance by the low-temperature substance detection device, the low-temperature substance collection layer recovers the ambient low-temperature substance.

Vapor cooling structure 400 conveys the recovered low-temperature substance to a low-temperature substance discharge structure 440 via a return passage 410. Low-temperature substance discharge structure 440 is configured to discharge a low-temperature substance at the target location, thereby rapidly cooling and stressing the material at the target location. In an embodiment, low-temperature discharge structure 440 is connected to return passage 410 by a control valve 430 which may be used to control the discharge of the low-temperature substance via low-temperature substance discharge structure 440. The characteristics of return passage 410 may vary according to the type of low-temperature substance utilized by drilling system 100. For example, where the low-temperature substance comprises carbon dioxide, return passage 410 should comprise materials and a configuration that allows for transmission of carbon dioxide at high pressures and low temperatures. Where the low-temperature substance comprises water, return passage 410 may comprise materials and a configuration that is sufficient for transmission of water at a lower pressure and higher temperature than those at which the carbon dioxide would be conveyed. The water may be pumped through return passage 410 via an external pump, may be fed through return passage via gravity without any external drive force, or may be transmitted via any other means known to those of skill in the art.

In at least one alternative embodiment, return passage 410 may be omitted from drilling system 100. According to such an embodiment, water (which may include water discharged from low-temperature substance discharge structure 440, condensed water that has pooled at the bottom of the well, etc.) may be collected from the bottom of drilling well 010 and pumped to purification tank 320. Water from purification tank 320 may then be returned to the cooling assembly and made available for re-discharge from low-temperature substance discharge structure 440. In addition to or alternatively to this embodiment, condensed water that naturally accumulates on the walls of drilling well 010 may be directly collected via a water collect structure as it flows down the walls of drilling well 010 and may be returned to the cooling assembly and made available for discharge from low-temperature substance discharge structure 440.

As discussed above, vapor cooling structure 400 may include a liquefaction system that converts the recovered low-temperature substance from a gaseous form to a liquid form. According to such an embodiment, the recovered low-temperature substance may be converted to liquid form prior to being transported to low-temperature substance discharge structure 440 via return passage 410. In at least one embodiment, liquefied carbon dioxide is discharged from low-temperature substance discharge structure 440 and eventually changes to a gaseous form. Vapor cooling structure 400 recovers the carbon dioxide in its gaseous form, converts it to liquid form using a liquefaction system, and returns it to low-temperature substance discharge structure 440 via return passage 410.

The cooling assembly may also include a pump and a return passage 450 that is configured to return water and any other fluids accumulated at the bottom of drilling well 010 to a purification tank 320. According to such an embodiment, return passage 450 may comprise piping as known to those of skill in the art and the pump may include any pump known to those of skill in the art capable of moving water from the bottom of drilling well 010 to purification tank 320. Purification tank 320 is configured to collect, purify, and/or recycle the accumulated water from the bottom of drilling well 010. The accumulated water may include varying amounts of drilling waste in addition to the water itself. The drilling waste may include particles of the drilled material that has become suspended in the water. Purification tank 320 is configured to purify the water by separating the water from the drilling waste. In at least one embodiment, purification tank 320 includes a filtration structure through which the water to be purified is passed. The filtration structure separates the water from particles of the drilled material that have become suspended in the water. The filtration structure may include an active carbon filter, a fiber or porous sponge filter, a filter cloth, or any other filtration structure known to those of skill in the art. The purified water from the bottom of drilling well 010 may be conveyed from purification tank 320 to main return passage 410 via passage 460 between purification tank 320 and main return passage 410.

Drilling system 100 also includes drill bit 200. In at least one embodiment, drill bit 200 includes one or more drilling teeth 210. Drilling teeth 210 may include any type of drilling bit known to those of skill in the art. For example, drilling teeth 210 may include roller bits, polycrystalline diamond compact (PDC) bits, diamond grinding teeth, etc. In addition, drill bit 200 may include, either alone or in combination with drilling teeth 210, a fluid cutting structure such as may be used in a jet drilling apparatus as known to those of skill in the art. The fluid cutting structure may include any apparatus known to those of skill in the art capable of ejecting a high pressure fluid for cutting through materials at the target location. Drilling teeth 210 and the fluid cutting structure are used to remove the material at the target location of drilling system 100.

Drilling system 100 may also include a discharge passage 220 that is configured to discharge drilling waste 011 created by the operation of drilling teeth 210 and/or the fluid cutting structure. In at least one embodiment, drill bit 200 is a rotary drill bit and discharge passage 220 is formed in a spiral configuration along a side surface of drill bit 200. As drill bit 200 rotates, drilling waste 011 is moved away from the working surface of drill bit 200 (i.e., drilling teeth 210 and/or the fluid cutting structure) and to an upper portion of drill bit 200 via discharge passage 220 where drilling waste 011 may be handled by a loading and unloading apparatus 330. In another embodiment, drilling waste 011 is transported away from the working surface of drill bit 200 via any process known to those of skill in the art.

Drilling system 100 further includes a loading and unloading apparatus 330 and a loading cabinet 310. In at least one embodiment, drilling waste 011 is moved from the working surface of drill bit 200 to loading and unloading apparatus 330 via discharge passage 220 or any other process or means known to those of skill in the art. Loading and unloading apparatus 330 is configured to load drilling waste 011 into a loading cabinet 310. Loading and unloading apparatus 330 may include a loading hopper, a pumping pipe, a conveyor, or any other device or system for loading drilling waste 011 into loading cabinet 310. Loading cabinet 310 includes a loading tank 311 that is configured to store drilling waste 011.

Loading cabinet 310 and/or loading and unloading apparatus 330 are connected to a loading rail 300 such that loading cabinet 310 and/or loading and unloading apparatus 330 may move along loading rail 300. In at least one embodiment, loading rail 300 is installed on an inner surface of drilling well 010. According to such an embodiment, one or more circle structures are mounted on the inner surface of drilling well 010 and loading rail 300 is attached to the one or more circle structures. In at least one embodiment, the one or more circle structures have a circular body with one or more holes distributed throughout the body. The one or more circle structures may be affixed to the surface of the well by nails, screws, or any other fasteners known to those of skill in the art. In at least one embodiment, the fasteners are passed through the one or more holes within the circular body and then attached to the surface of the well. Loading rail 300 may be inserted within the circular body of the one or more circle structures such that loading rail 300 is nested within the one or more circle structures and the circular body of each of the one or more circle structures at least substantially surrounds loading rail 300. In at least one embodiment, the circle structures are spaced along the surface of drilling well 010 such that contiguous circle structures have a distance apart of about 50 meters. Alternative distances may be utilized in accordance with the design requirements of the specific application. In alternative embodiments, loading rail 300 may be affixed to the inner surfaces of drilling well 010 via any means or fasteners known to those of skill in the art.

In at least another embodiment, loading rail 300 may include a screw thread or grooves that interact with a support structure of loading cabinet 310 such that loading cabinet 310 may move along loading rail 300. Loading cabinet 310 further includes a drive structure that is configured to propel loading cabinet 310 along loading rail 300. In at least one embodiment, the drive structure includes a rotary drive device that is configured to interact with the screw thread or grooves of loading rail 300 such that as the rotary drive device rotates, loading cabinet 310 is propelled along loading rail 300. According to such an embodiment, drilling waste 011 may be transported by loading cabinet 310 along loading rail 300 out of drilling well 010 via well door 401. In alternative embodiments, loading cabinet 310 may be moved along loading rail 300 or may be transported into and out of drilling well 010 via any process, system, or device known to those of skill in the art. Drilling waste 011 may then be discharged from loading cabinet 310 via loading and unloading apparatus 330 or any other unloading mechanism or system known to those of skill in the art.

Figure 2A:
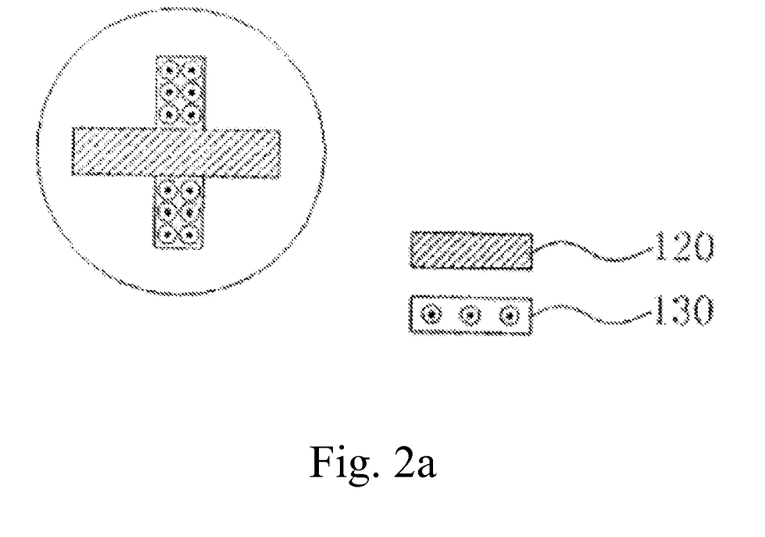
FIGS. 2a-2e depict a working end of a drill bit body in accordance with various illustrative embodiments.

FIG. 2a depicts the working end of drill bit 200 in accordance with one illustrative embodiment. According to such an embodiment, one or more discharge structures 130 are arranged in a horizontal strip across the working end of drill bit 200. One or more discharge structures 120 are arranged in a vertical strip across the working end of drill bit body 110 such that the strip of discharge structures 120 intersects and is rotationally offset from the strip of discharge structures 130. In the embodiment of FIG. 2a, the strip of discharge structures 120 is arranged generally perpendicular to the strip of discharge structures 130, however in alternative embodiments the strip of discharge structures 120 may have any angular relationship to the strip of discharge structures 130 based on the design needs from the given drill apparatus.

In at least one embodiment, one or more discharge structures 120 may be configured to discharge a high-temperature substance and one or more discharge structures 130 may be configured to discharge a low-temperature substance. In at least one alternative embodiment, one or more discharge structures 120 may be configured to discharge a low-temperature substance and one or more discharge structures 130 may be configured to discharge a high-temperature substance.

Figure 2B:
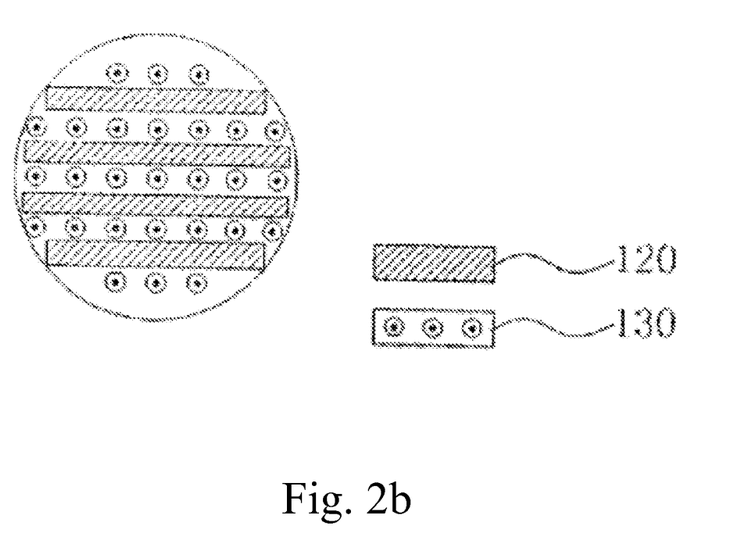

FIG. 2b depicts the working end of drill bit 200 in accordance with another illustrative embodiment. According to such an embodiment, one or more discharge structures 120 are arranged in a multiple number of first strips across the working end of drill bit 200 and one or more discharge structures 130 are arranged in a multiple number of second strips across the working end of drill bit 200 such that is the multiple first strips of discharge structures 120 are intermingled with the multiple second strips of discharge structures 130. Such a configuration allows for a high density of discharge structures 120 and 130 upon the working end of drill bit 200 and may be useful for treatment of high density and very hard materials.

Figure 2C:
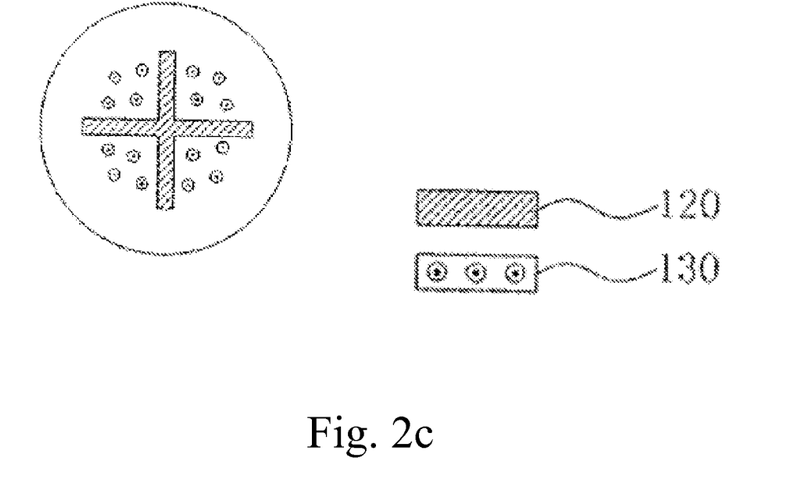

FIG. 2c depicts the working end of drill bit 200 in accordance with still another illustrative embodiment. According to such an embodiment, one or more discharge structures 120 are arranged in one or more strips across a working end of drill bit 200 and one or more discharge structures 130 are arranged in areas of the working end of drill bit 200 that are divided by the one or more strips of discharge structures 120. In the present embodiment, the one or more discharge structures 120 are formed in a crisscross pattern; however in additional embodiments, any number of strips of discharge structures 120 may be formed on the working end of drill bit 200. In one alternative embodiment, one or more discharge structures 130 are arranged in the one or more strips and one or more discharge structures 120 are arranged in areas divided by the one or more strips of the discharge structures 130. The embodiment of FIG. 2c allows for discharge structures 120 and 130 to be distributed with large spaces therebetween and may be useful for treatment of hard and crisp materials.

Figure 2D:
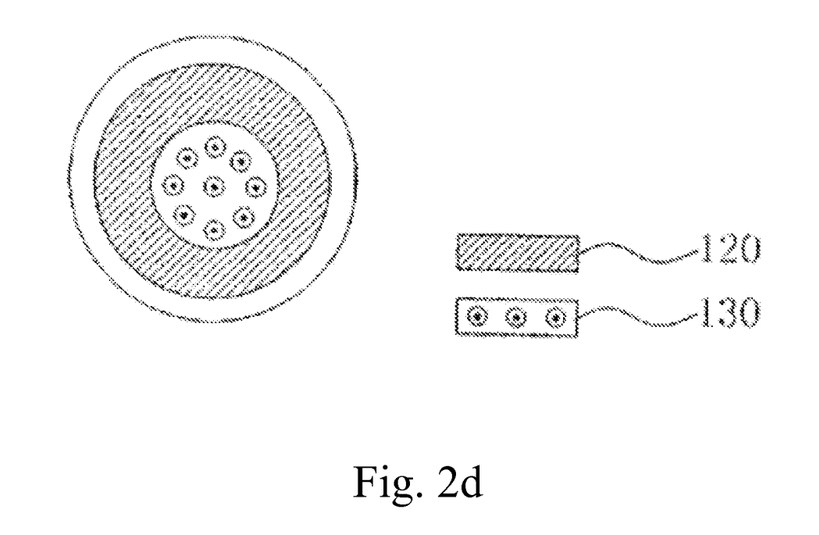

FIG. 2d depicts the working end of drill bit 200 in accordance with yet another illustrative embodiment. According to such an embodiment, one or more discharge structures 130 are arranged in an inner circle and one or more discharge structures 120 are arranged in an outer circle that surrounds the inner circle. In one alternative embodiment, the location of discharge structures 120 and 130 may be swapped such that discharge structures 120 are disposed within the inner circle and discharge structures 130 are disposed within the outer circle surrounding the inner circle. Such configurations allow for discharge structures 120 and 130 to be distributed with high density and uniformity.

Figure 2E:
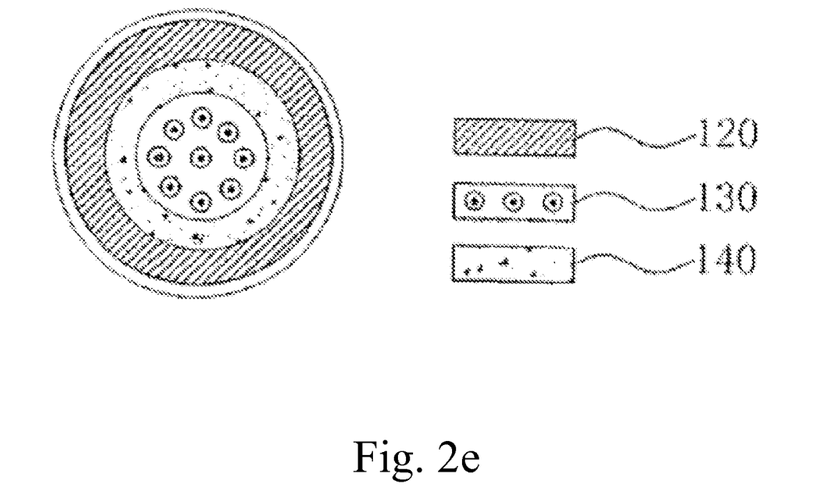

FIG. 2e depicts the working end of drill bit 200 in accordance with a further illustrative embodiment. According to such an embodiment, one or more discharge structures 130 are arranged in an inner circle and one or more discharge structures 120 are arranged in an outer circle that surrounds the inner circle. In addition, grinding teeth 140 are arranged in a ring shape around the inner circle of discharge structures 130 and within the outer circle of discharge structures 120. In one alternative embodiment, the location of discharge structures 120 and 130 may be swapped such that discharge structures 120 are disposed within the inner circle and discharge structures 130 are disposed within the outer circle surrounding the inner circle and ring of grinding teeth 140. Such an embodiment allows for the target location to be drilled simultaneously with the application of the high-temperature and low-temperature substances via discharge structures 120 and 130, respectively.

Figure 3:
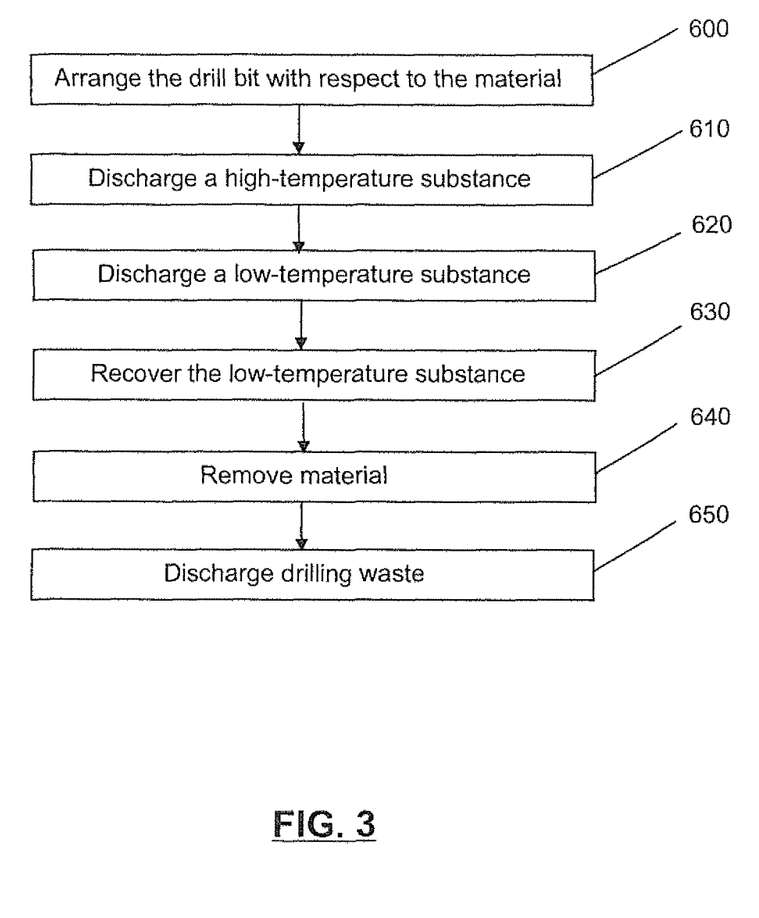
FIG. 3 depicts a flow diagram of a method for drilling in accordance with an illustrative embodiment.

FIG. 3 depicts a flow diagram of a method for drilling using drilling apparatus 100 of FIG. 1 in accordance with an illustrative embodiment. In an operation 600 (Arrange the drill bit with respect to the material), drill bit 200 is arranged with respect to a target location of a material to be drilled. In at least one embodiment, the material to be drilled may be granite, graphite, or any other material or rock strata known to those of skill in the art.

In an operation 610 (Discharge a high-temperature substance), a high-temperature substance is discharged at the target location of the material via high-temperature discharge structures 520 to rapidly heat the material to be drilled. In at least one embodiment, the high-temperature substance is a high-temperature plasma or any other high-temperature substance known to those of skill in the art that is suitable for such a use. The high-temperature substance may include any substance that can be changed into a high-temperature plasma. For example, the high temperature substance may include one or more of water, air, oxygen, nitrogen, and carbon dioxide. In at least one embodiment, the high-temperature substance is a high-temperature plasma having a temperature of between approximately 3,000 degrees Celsius and approximately 5,000 degrees Celsius. In additional embodiments, the high-temperature plasma may have a temperature of between approximately 2,000 degrees Celsius and approximately 20,000 degrees Celsius. In at least another embodiment, the temperature of the high-temperature plasma corresponds to the coefficient of thermal expansion of the material to be drilled, such that a higher temperature plasma is required for materials having a lower coefficient of thermal expansion. For example, material comprising mainly silicon dioxide may have a thermal expansion of about $0.5 \times 10^{-6}$/K and material comprising mainly granite may have a thermal expansion of about $4.6 \times 10^{-6}$/K. According to such an example, a lower temperature high-temperature plasma may be utilized for the granite than the silicon dioxide to achieve similar heating and expansion results.

The pressure of the ejected high-temperature plasma will vary according to the amount of plasma ejected, and the amount of plasma ejected may vary based on the hardness and other characteristics of the material to be drilled at the target location. In at least one embodiment, the pressure of the ejected high-temperature plasma may be between about 0.5 and 50 atmospheres (atm). In an alternative embodiment, a high energy laser as discussed further above may be emitted at the target location of the material to rapidly heat the material.

In an operation 620 (Discharge a low-temperature substance), a low-temperature substance is discharged at the target location of the material via low-temperature discharge structures 440 to rapidly cool the material to be drilled. In at least one embodiment, the low-temperature substance may be a fluid that includes one or more of water, liquid carbon dioxide, dry ice, or a mixture containing carbon dioxide and other substances. According to an embodiment in which the low-temperature substance comprises water, the water may have a temperature of approximately 100 degrees Celsius. In another embodiment where the low-temperature substance includes carbon dioxide, the carbon dioxide may be maintained at a temperature of about 15 degrees Celsius and under a pressure of about 5 megapascals. In at least one embodiment, the discharge of the low-temperature substance is designed such that the amount of heat energy absorbed by the low-temperature substance is substantially equivalent to the amount of heat energy emitted by the high-temperature substance. Accordingly, where the amount of high-temperature substance discharged is based on the hardness or other characteristics of the material to be drilled at the target location, the amount of low-temperature substance discharged and the pressure of the discharge will also correspond to the hardness and possibly other characteristics of the material to be drilled. In at least one embodiment, the pressure at which the low-temperature substance is discharged may range between about 2 and 20 atm.

The application of the high-temperature and low-temperature substances to the material stresses and weakens the material often causing it to crack. The weakened and possibly cracked material is more susceptible to mechanical rotary drilling or other traditional drilling processes.

According to at least one embodiment, the high-temperature substance is discharged via operation 610 for a first duration of time and then the low-temperature substance is discharged via operation 620 for a second duration of time following the first duration of time. In one example, the first and second durations of time may be between approximately 3 and 10 seconds, respectively. In one alternative embodiment, operation 620 may be performed prior to operation 610, or simultaneously so as to concurrently apply the high-temperature substance and the low-temperature substance to the target location of the material to be drilled. In another embodiment, operations 610 and 620 may be alternately performed. Operations 610 and 620 may be performed for selected durations of time and may be intermittently performed at predefined intervals, e.g., approximately 3 second intervals. In still another embodiment, operations 610 and 620 may be performed simultaneously, such that the high-temperature and low-temperature substances are simultaneously discharged.

In an operation 630 (Recover the low-temperature substance), at least a portion of the discharged low-temperature substance is recovered via vapor cooling structure 400 and/or return passage 450/purification tank 320. In at least one embodiment, as the low-temperature substance is discharged, it converts to a gaseous form within the working environment of drilling system 100. Vapor cooling structure 400 removes at least a portion of the gaseous low-temperature substance from the working environment and converts it to a liquid or superfluid for The recovered low-temperature substance is returned to drill bit 200 through which it may be re-discharged at the target location via low-temperature discharge structures 440. In another embodiment, discharged water or other fluid that has accumulated at the bottom of the well may be collected and recycled after it is filtered to remove drilling waste. This filtered water may also be returned to drill bit 200 to be re-discharged at the target location via low-temperature discharge structures 440.

In an operation 640 (Remove material), drill bit 200 is operated to remove the weakened material at the target location. Operation 640 may be performed after or simultaneously with one or more of operations 610, 620, and 630. In at least one embodiment, drill bit 200 may be rotated to cause drilling teeth 210 to grind away the material at the target location. In one alternative embodiment, a fluid cutting structure may be used to remove the material at the target location. In a further embodiment, drilling teeth 210 and a fluid cutting structure may both be utilized by drill bit 200 to remove the material at the target location. In additional embodiments, any traditional drilling process known to those of skill in the art may be utilized to remove the weakened material at the target location.

In an operation 650, (Discharge drilling waste), drilling waste such as the removed material is discharged from the well. In at least one embodiment, drilling waste is conveyed via discharge passage 220 from a working surface of drill bit 200 to an upper portion of drill bit 200. In at least one such embodiment, drill bit 200 is a rotary drill bit and discharge passage 220 is formed in a spiral configuration along a side surface of drill bit 200 such that upon rotation of drill bit 200, the drilling waste is moved away from the working surface of drill bit 200. The drilling waste is loaded into a loading tank 311 which is movable along a loading rail 300 for transport of the drilling waste out of the drilling well. The drilling waste may be loaded into loading tank 311 via a loading and unloading apparatus 330. According to at least one such embodiment, loading tank 311 may be propelled along loading rail 300 via a drive structure such that the drilling waste is transported by loading tank 311 along loading rail 300 and out of drilling well 010.

One or more methods have been described herein and one or more flow diagrams may have been used herein. The discussion of the operations of the method and the use of flow diagrams is not meant to be limiting with respect to the order of operations performed. The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for drilling using a drilling apparatus, the method comprising:
    discharging a high-temperature substance at a target location of a material to be drilled from one or more first discharge structures of a heating assembly to rapidly heat the material at the target location;
    discharging a low-temperature substance at the target location of the material from one or more second discharge structures of a cooling assembly to rapidly cool the material at the target location;
    operating a digging assembly to remove substrate from the material at the target location; and
    moving drilling waste from a working surface of a drill bit of the drilling assembly to a drilling waste loading apparatus located at an opposite end of the drill bit via a spiral discharge passage formed along a surface of the drill bit.

2. The method of claim 1, wherein the high-temperature substance comprises at least one of a high-temperature plasma and a high energy laser beam.

3. The method of claim 1, wherein the low-temperature substance comprises one or more of liquefied carbon dioxide and a mix of liquefied carbon dioxide and water.

4. The method of claim 1, further comprising:
    recovering at least a portion of the discharged low-temperature substance at a low-temperature substance recovery structure; and
    passing the recovered low-temperature substance from the low-temperature substance recovery structure to the cooling assembly in preparation for subsequent discharge via the one or more second discharge structures at the target location of the material.

5. The method of claim 4, further comprising filtering the recovered low-temperature substance and returning the recovered low-temperature substance to the cooling assembly.

6. The method of claim 1, wherein the discharging the high-temperature substance is performed simultaneously with the discharging the low-temperature substance.

7. The method of claim 6, wherein the operating the digging assembly to remove substrate is performed simultaneously with the discharging the high-temperature substance and the discharging the low-temperature substance.

8. A drilling apparatus comprising:
a drill bit;
a heating assembly configured to rapidly heat a material to be drilled at a target location, wherein the heating assembly includes one or more first discharge structures configured to discharge a high-temperature substance at the target location of the material;
a cooling assembly configured to rapidly cool the material at the target location, wherein the cooling assembly includes one or more second discharge structures configured to discharge a low-temperature substance at the target location of the material; and
a digging assembly configured to remove substrate from the material at the target location;
wherein one or more of the heating assembly, the cooling assembly, and the digging assembly are located within the drill bit, and wherein the drill bit comprises a spiral discharge passage configured to move waste from a working surface of the drill bit to an upper portion of the drill bit.

9. The drilling apparatus of claim 8, wherein the high-temperature substance comprises one or more of a high-temperature plasma and a high energy laser beam, and the low-temperature substance comprises one or more of water and liquefied carbon dioxide.

10. The drilling apparatus of claim 8, further comprising:
a vapor cooling structure configured to recover at least a portion of the low-temperature substance after discharge, wherein the low-temperature substance after discharge comprises at least one of water vapor or gaseous carbon dioxide; and
a return passage located between the cooling assembly and the vapor cooling structure, wherein the return passage is configured to pass the recovered low-temperature substance from the vapor cooling structure to the cooling assembly.

11. The drilling apparatus of claim 8, further comprising:
a recovery structure configured to recover at least a portion of the discharged low-temperature substance;
a purification tank configured to filter the recovered discharged low-temperature substance; and
a return passage configured to return the filtered low-temperature substance to the cooling assembly.

12. The drilling apparatus of claim 8, wherein the one or more first discharge structures, the one or more second discharge structures, and the digging assembly are arranged across a working end of the drill bit.

13. The drilling apparatus of claim 12, wherein the one or more first discharge structures and the one or more second discharge structures are arranged according to at least one of the following configurations:

a) the one or more first discharge structures are arranged in a first strip across a working end of the drill bit body, the one or more second discharge structures are arranged in a second strip across the working end of the drill bit body, and the second strip intersects the first strip and is rotationally offset from the first strip; and b) the one or more first discharge structures are arranged in an inner circle across a working end of the drill bit, the one or more second discharge structures are arranged in an outer circle across the working end of the drill bit, and the inner circle is within the outer circle.

14. The drilling apparatus of claim 8, wherein the digging assembly comprises at least one of a fluid cutting structure and one or more drilling teeth.

15. The drilling apparatus of claim 8, wherein the heating assembly and the cooling assembly are configured to simultaneously discharge the high-temperature substance and the low-temperature substance, respectively.

16. The drilling apparatus of claim 8, wherein the one or more first discharge structures are arranged in a plurality of first strips across a working end of the drill bit body, wherein the one or more second discharge structures are arranged in a plurality of second strips across the working end of the drill bit, and wherein the plurality of first strips are intermingled with the plurality of second strips.

17. The drilling apparatus of claim 8, wherein the one or more first discharge structures are arranged in an inner circle across a working end of the drill bit, wherein the one or more second discharge structures are arranged in an outer circle across the working end of the drill bit, and wherein the inner circle is within the outer circle.

18. A drilling apparatus comprising:
a drill bit;
a heating assembly configured to rapidly heat a material to be drilled at a target location, wherein the heating assembly includes one or more first discharge structures configured to discharge a high-temperature substance at the target location of the material;
a cooling assembly configured to rapidly cool the material at the target location, wherein the cooling assembly includes one or more second discharge structures configured to discharge a low-temperature substance at the target location of the material;
a digging assembly configured to remove substrate from the material at the target location; and
a waste discharge assembly that comprises:
a loading cabinet;
a loading rail;
a loading and unloading apparatus configured to load waste from a spiral discharge passage into the loading cabinet and unload waste from the loading cabinet; and
a drive structure configured to move the loading cabinet and the loading and unloading apparatus along the loading rail.

* * * * *